May 26, 1964     T. F. KNAPP     3,134,937

SYNCHRONIZATION OF DIRECT CURRENT MOTORS

Filed June 21, 1962

INVENTOR.
THEODORE F. KNAPP
BY *Price & Heneveld*
ATTORNEYS

United States Patent Office 3,134,937
Patented May 26, 1964

3,134,937
SYNCHRONIZATION OF DIRECT CURRENT MOTORS
Theodore F. Knapp, Grand Rapids, Mich., assignor to Lear Siegler, Inc.
Filed June 21, 1962, Ser. No. 204,245
3 Claims. (Cl. 318—43)

This invention concerns the synchronization of direct current motors, and more particularly a system of synchronization in which the mechanical load on one of the synchronized motors is transmitted electrically to the other.

There are many instances in electrical technology in which it is desirable to synchronize two or more direct current motors. Several methods for accomplishing this purpose have previously been proposed; among them, a method of connecting all the motors to be synchronized in parallel with one another, winding by winding, and connecting the parallel-connected windings to a common commutator. The disadvantage of that method is that if the motors are unevenly loaded, they are not self-starting, and if the load differential becomes too great during running, the most heavily loaded motor has a tendency to stall.

The present invention solves this problem by providing a master motor and one or more slave motors interconnected with it which may be identical in construction but are connected slightly differently to the power source, as follows: In the master motor, one pole of the direct current power supply is connected directly to the center tap of the given winding, and the other ends of that same winding are connected to the other pole of the direct current power source through appropriate commutating devices which alternately energize one or the other end of the winding. In the slave motor, these ends of the corresponding winding are connected to the same commutating devices as the ends of the winding of the master motor, but there is no power connection to the center tap of the winding. The effect of this arrangement is that the slave motor has to draw its power through the inactive half of the master motor's winding during each commutation half-cycle. This current flow opposes the current flow through the active half of the master motor's winding and thus loads the master motor in direct proportion to the load current drawn by the slave motor.

It is therefore the object of this invention to provide a system of synchronized direct current motors which is entirely self-starting regardless of the load distribution among the synchronized motors.

It is a further object of this invention to provide a system of synchronized direct current motors that is stall-resistant when faced with a sudden surge load on one of the motors of the system.

These and other objects of the invention will become apparent from the following specification, taken in connection with the attached drawings forming a part of this application, in which.

Basically, the system of the invention operates on the principle that the master motor has a center-tapped split winding of which one half is active during one half of the commutation cycle, and the other half is active during the other half of the commutation cycle. The winding of the slave motor to be synchronized with the master motor is then connected across the winding of the master motor in such a manner that at any given time, it draws its operating current through the inactive half of the master motor's winding. This causes any load on the slave motor to be transmitted to the master motor, and consequently the two motors will always behave as if they were equally loaded whenever the load on the slave motor is varied. A load on the master motor is not electrically transmitted to the slave motor, but the proper regulation is effected by tying the operation of the commutating devices to the speed of the master motor, so that a slowing of the master motor under a heavy load will automatically result in a slowing of the slave motor due to delayed commutation, and the motors once again are kept in synchronism.

The basic physical structure to carry out the invention consists of two or more direct current motors, at least one of which has a center-tapped split winding. One pole of the direct current power source is connected to the center tap of that winding, and the ends of corresponding windings of each motor are connected to the other pole of the direct current power source through appropriate commutating devices whose operation is regulated by the speed of the motor with the center-tapped winding.

Figure 1:
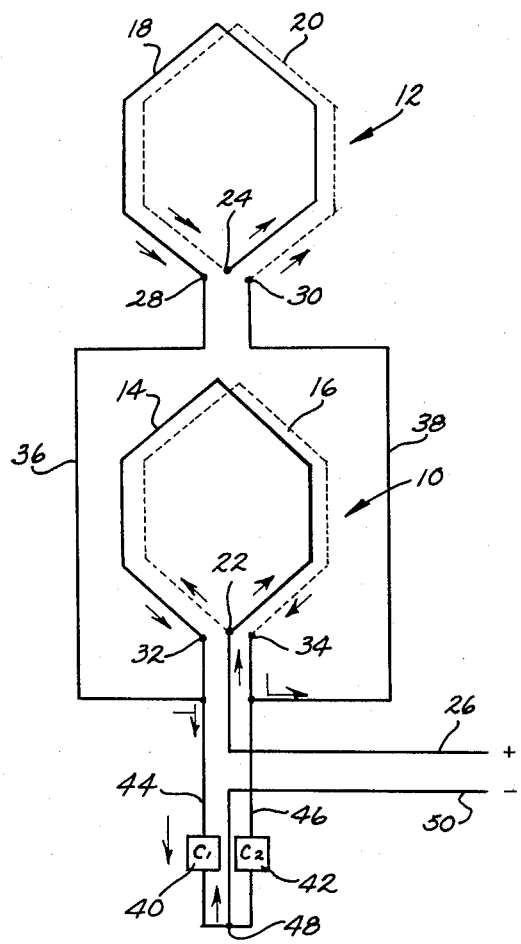
FIG. 1 is a schematic diagram showing the physical arrangement of typical incremental windings of a pair of motors to be synchronized, and their electrical interconnection for synchronization purposes.

Referring now to the drawings, a typical physical arrangement of incremental windings of two motors to be synchronized is shown in FIG. 1. Those skilled in the art will understand that direct current motors are normally constructed with a plurality of separately commutated electrical windings which have no electrical interconnection with each other except through the commutator, and which normally have one portion wound about a certain number of teeth in a first winding direction, and another portion wound about different teeth in the other winding direction. The combination of these two portions is known as a split winding and is depicted schematically in FIG. 1 at 10 and 12, respectively. Winding 10 has a forward portion 14 and a reverse portion (shown in dotted lines) 16, whereas the identical slave motor winding 12 has a forward portion 18 and a reverse portion (shown in dotted lines) 20. Each of the windings 10, 12 may have a center tap 22, 24, respectively, at the point of junction of the forward portion and reverse portion. The difference is that the center tap 22 of the master motor winding 10 is connected to the positive pole 26 of the power supply, whereas the center tap 24 of the slave motor winding 12 is not connected to anything. The outer ends 28, 30 of the slave motor winding 12 are connected in parallel with the outer ends 32, 34 of the master motor winding 10 by wires 36, 38 respectively. The parallel-connected ends of the windings 10, 12 are connected to commutating devices 40, 42 by wires 44, 46. The other ends of the commutating devices 40, 42 are joined together at junction 48, which in turn is connected to the negative pole of the power supply by wire 50.

Figure 2:
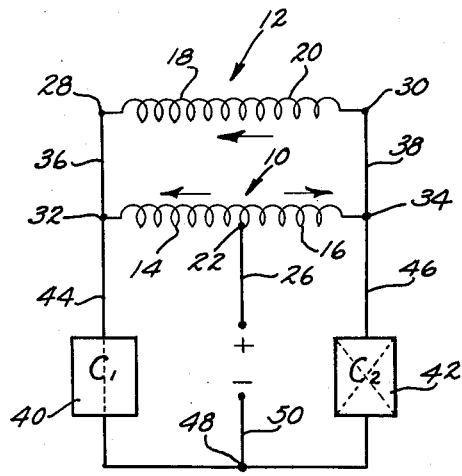
FIG. 2 is a schematic electrical diagram showing the electrical arrangement of the connections shown in FIG. 1.

Turning now to FIG. 2, it will be seen that the circuit of FIG. 1 can be represented schematically in the somewhat simpler form of FIG. 2. The corresponding numbers in FIG. 1 and FIG. 2 indicate identical elements and will readily make it clear how the circuit of FIG. 1 corresponds electrically to that of FIG. 2.

The dotted lines in the commutating devices 40, 42 of FIG. 2 indicate that during the half-cycle depicted in FIG. 2, the commutating device 40 is closed while commutating device 42 is open.

Figure 3:
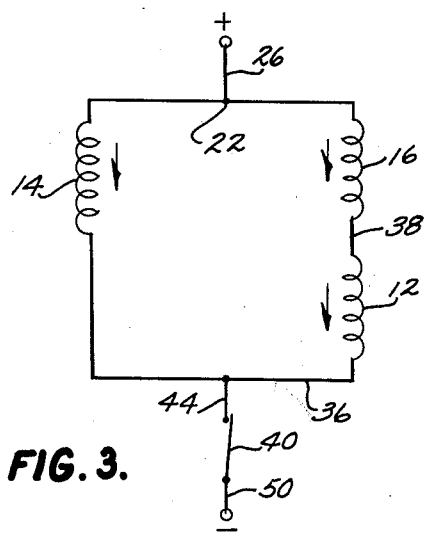
FIG. 3 is the equivalent circuit diagram of the circuit of FIG. 2 for any given half-cycle of the commutation device.

For further simplification of the electrical circuit of FIG. 2, the momentary condition of the circuit during the half cycle indicated in FIG. 2 can be schematically shown by the representation of FIG. 3. Again, corre-

Operation

During the forward half-cycle of the commutating cycle, current flow through the two windings 10, 12 can be traced as follows: The entire current flows from the positive pole of the power source through wire 26 to center tap 22. Here, the current splits into two paths. The first path goes through the forward portion 14 of master motor winding 10 to end 32 and then through wire 44, commutating device 40 and junction 48, and wire 50 back to the negative pole of the power supply. The commutating devices 40, 42 have been labeled $C_1$ and $C_2$ to indicate that they are closed during the first or forward half of the commutating cycle, and during the second or reverse half of the commutating cycle, respectively. Consequently, during the forward half-cycle, commutating device 40 is equivalent to a closed switch, while commutating device 42 is equivalent to an open switch. The other current path from center tap 22 can be traced through the reverse portion 16 of master motor winding 10 to end 34. Since during this half-cycle, commutating device 42 is open, current flow has to continue through wire 38, end 30, the reverse portion 20 of slave winding 12, center tap 24, the forward portion 18 of slave motor winding 12, end 28, and wire 36 to wire 34 where it rejoins the previously described path coming from end 32.

The net effect of this connection is most graphically shown in FIGS. 2 and 3. It will be seen from FIG. 3 that the various winding portions are connected across the power supply in a parallel circuit whose branches comprise, respectively, the winding portion 14 of master motor winding 10, and the winding portion 16 of master motor winding 10 connected in series with the entire slave motor winding 12. It will be readily seen from FIG. 2 that the current flow through portion 14 is in the opposite direction from the current flow in portion 16. Since the two winding portions of each winding are wound in series-aiding relationship, it will readily be understood that the magnetic effect of the current flow through winding portion 16 bucks the magnetic effect of the current flow through winding portion 14. The current flow through winding portion 16, on the other hand, is identical to the current flow through the slave motor winding 12, as will be readily apparent from FIG. 3. Therefore, the heavier the mechanical load on the slave motor, the more current its winding 12 will draw. This causes more current to be drawn through the winding portion 16, and this in turn reduces the net magnetic drive effect on the master motor created by the combination of winding portions 14 and 16. As a result, the master motor 10 is weakened to the point where its constant load imposes the same strain on it as the increased load imposes on slave motor 12. As a reseult, both motors will tend to slow down by a like amount and will consequently have no difficulty maintaining synchronism with each other.

If it is the master motor instead of the slave motor that has to accommodate a heavy load, the extra current drawn by winding portion 14 does not materially affect the operation of the other branch of the parallel circuit of FIG. 3. However, the resulting slowing of the master motor will affect the length of the commutation cycles of the commutating devices 40, 42 because, as has been previously said, the operation of these commutating devices is operatively tied to the speed of the master motor. Consequently, the slave motor 12 will automatically follow the speed variations of the master motor because it is commutated simultaneously with the master motor. This, however, does not affect the strength of the slave motor, and therefore there is no danger of its stalling.

It will be understood that in the foregoing description, the commutating devices 40, 42 may be of any desired construction, i.e. they may take the form of a conventional commutator, or they may be of the type described in my co-pending application Serial No. 204,223 filed June 21, 1962, and entitled Brushless Direct Current Motor.

Obviously, the invention is capable of being carried out in a variety of different ways of which the example discussed herein is only illustrative. Consequently, I do not wish to be limited by the embodiment described, but only by the scope of the following appended claims.

I claim:

1. A synchronized direct-current motor system, comprising: a master motor having a pair of series-aiding-connected incremental winding portions, said portions having free outer ends and interconnected inner ends; at least one slave motor, having slave winding portions connected in parallel with said outer ends; a direct current power supply, having two oppositely charged poles; means connecting one of said poles to said interconnected ends; commutating means, having two portions, operable 180 electrical degrees apart in synchronous response to operation of said master motor to alternatingly connect said free outer ends to the other of said poles, whereby the amounts of electrical current supplied to said slave winding portions are correspondingly changed in direct response to changes in the amounts of current being drawn through said incremental winding portions.

2. A synchronized direct-current motor system, comprising: a master motor; at least one slave motor; commutating means operated in synchronism with said master motor; each of said motors having a split center-tapped winding, said windings being connected in parallel by the outer ends thereof; means connecting said commutating means to one pole of a direct current electrical power supply and to the said outer ends of said windings, whereby said outer ends are alternatingly connected to said one pole; and means connecting the other pole of said supply only to the center tap of the winding of said master motor.

3. A circuit for synchronizing direct current electric motors which each have at least one winding comprising a pair of concentric series-aiding-connected incremental winding portions joined at their inner ends and arranged to drive their respective motors by alternating application of a given pole of a direct-current power supply to one or the other of their outer ends; comprising first and second current conducting means connecting said outer ends of corresponding winding portion pairs of each of said motors in parallel, a third current conducting means connecting the inner ends of the winding portions of one of said motors to one pole of said direct current power supply, a first commutating means connected to one of said outer ends, and operable in response to operation of a master motor of said motors, a second commutating means connected to the other of said outer ends and operable 180 electrical degrees, out of phase with said first commutating means in response to operations of said master motor, and a fourth current conducting means connecting said first and second commutating means to the other pole of said direct current power supply.

References Cited in the file of this patent

UNITED STATES PATENTS

| | | |
|---|---|---|
| 2,635,220 | Dupy | Apr. 14, 1953 |
| 2,673,317 | Nichols et al. | Mar. 23, 1954 |